United States Patent
Ng et al.

(10) Patent No.: US 11,698,549 B2
(45) Date of Patent: Jul. 11, 2023

(54) MULTI-VIEW DISPLAY PANEL

(71) Applicant: Misapplied Sciences, Inc., Redmond, WA (US)

(72) Inventors: Albert Han Ng, Pasadena, CA (US); David Steven Thompson, Redmond, WA (US); David Randall Bonds, Chatsworth, GA (US)

(73) Assignee: Misapplied Sciences, Inc., Pasadena, CA (US)

( * ) Notice: Subject to any disclaimer, the term of this patent is extended or adjusted under 35 U.S.C. 154(b) by 0 days.

(21) Appl. No.: 17/200,733

(22) Filed: Mar. 12, 2021

(65) Prior Publication Data

US 2022/0163842 A1  May 26, 2022

Related U.S. Application Data

(60) Provisional application No. 62/989,099, filed on Mar. 13, 2020.

(51) Int. Cl.
| | | |
|---|---|---|
| *G02F 1/1335* | (2006.01) | |
| *G02F 1/1333* | (2006.01) | |
| *G02F 1/13357* | (2006.01) | |

(52) U.S. Cl.
CPC .. *G02F 1/133526* (2013.01); *G02F 1/133308* (2013.01); *G02F 1/133504* (2013.01); *G02F 1/133512* (2013.01); *G02F 1/133603* (2013.01); *G02F 1/133607* (2021.01)

(58) Field of Classification Search
None
See application file for complete search history.

(56) References Cited

U.S. PATENT DOCUMENTS

| | | | | | |
|---|---|---|---|---|---|
| 3,614,310 | A | * | 10/1971 | Korpel | H04N 5/30 348/625 |
| 5,351,151 | A | * | 9/1994 | Levy | G02B 3/0068 359/275 |
| 6,646,281 | B1 | * | 11/2003 | Krantz | G03F 1/84 348/125 |
| 10,778,962 | B2 | | 9/2020 | Ng et al. | |
| 2001/0015780 | A1 | * | 8/2001 | Yamaguchi | G02B 5/0284 349/112 |

(Continued)

FOREIGN PATENT DOCUMENTS

| | | | |
|---|---|---|---|
| JP | 2636338 B2 | * | 7/1997 |
| KR | 20080037476 A | * | 4/2008 |

*Primary Examiner* — Shan Liu
(74) *Attorney, Agent, or Firm* — Seed IP Law Group LLP

(57) ABSTRACT

A multi-view (MV) display panel includes a flat panel display (FPD) having FPD pixels, and lenses configured to image the FPD. Each of the FPD pixels, when imaged through one of the lenses, forms a beamlet that is emitted in a direction unique from other beamlets formed by other FPD pixels through the lens. The lens and the FPD pixels which, when imaged through the lens, form beamlets emitted in different directions collectively configure an MV pixel. Each of the FPD pixels includes multiple sub-pixels. The MV display panel also includes a diffuser arranged between the FPD and the lenses, and a light block configured to isolate a diffusion of the multiple sub-pixels of each FPD pixel from its neighboring FPD pixels. The FPD may be backlit using custom lighting and optics. Lens elements may be staggered in a manner that facilitates assembly of the lenses.

16 Claims, 9 Drawing Sheets

(56) References Cited

U.S. PATENT DOCUMENTS

| | | | |
|---|---|---|---|
| 2003/0156077 A1* | 8/2003 | Balogh | G02B 30/27 345/6 |
| 2008/0094700 A1* | 4/2008 | Uehara | H04N 13/305 359/463 |
| 2011/0001804 A1* | 1/2011 | Urey | G02B 30/24 348/51 |
| 2011/0285934 A1* | 11/2011 | Watanabe | G02F 1/133526 349/58 |
| 2012/0008070 A1* | 1/2012 | Takemoto | G02B 3/005 349/96 |
| 2015/0138484 A1* | 5/2015 | Watanabe | G02F 1/133308 349/58 |
| 2017/0242290 A1* | 8/2017 | Jenkins | G02B 6/0036 |
| 2018/0277032 A1* | 9/2018 | Ng | G06F 3/1446 |

* cited by examiner

MULTI-VIEW DISPLAY PANEL

BACKGROUND

Technical Field

The present disclosure relates to multi-view (MV) display panels that send different content to each of multiple viewers at the same time.

Description of the Related Art

MV display panels are known in the art. For example, a precision multi-view display that allows multiple viewers to simultaneously perceive different messages, content, or visual effects on the display is described in U.S. Pat. No. 10,778,962 by Ng et al., which is incorporated by reference herein in its entirety. Conventional display panels may have degraded display characteristics when different content is displayed in respective viewing zones at the same time. In addition, conventional display panels may be difficult to assemble.

BRIEF SUMMARY

MV display panels according to the present disclosure have improved display characteristics compared to conventional MV display panels. For example, MV display panels according to the present disclosure prevent more light from bleeding from a first viewing zone into a second viewing zone than conventional MV display panels. In addition, MV display panels according to the present disclosure can be assembled more easily than conventional MV display panels. For example, optical lens panels of MV display panels according to the present disclosure can be assembled more easily than optical lens panels of conventional MV display panels.

A multi-view (MV) display panel according to an aspect of the present disclosure may be characterized as comprising a flat panel display (FPD) including a plurality of FPD pixels, and a plurality of lenses configured to image the FPD. Each of the plurality of FPD pixels, when imaged through one of the plurality of lenses, forms a beamlet that is emitted in a direction unique from other beamlets formed by other FPD pixels through the lens. The lens and the FPD pixels which, when imaged through the lens, form beamlets emitted in different directions collectively configure an MV pixel. Each of the plurality of FPD pixels includes multiple sub-pixels. The MV display panel also includes a diffuser arranged between the FPD and the plurality of lenses, and a light block configured to isolate a diffusion of the multiple sub-pixels of each FPD pixel from its neighboring FPD pixels.

The light block may comprise grooves that are etched into a cover layer of the FPD, aligned with perimeters of each FPD pixel, and configured to prevent light of each FPD pixel from passing into an area above its neighboring FPD pixels. The grooves may be filled with an opaque material to absorb stray light. A coefficient of thermal expansion of the cover layer of the FPD may be configured to correspond to a coefficient of thermal expansion of an internal layer of the FPD to mitigate misalignment of the grooves relative to the FPD pixels due to thermal expansion or contraction.

The light block may comprise a baffle layer placed between the FPD and the diffuser.

The light block may comprise micro-optics or metasurfaces.

The FPD may be selected from a group consisting of an LCD (liquid crystal display), an OLED (organic light-emitting diode) display, and a micro LED display.

Each of the plurality of lenses may be formed of multiple lens elements that are layered.

The diffuser may be selected from a group consisting of a diffusion film placed on the FPD, a diffusion cover layer of the FPD, and a diffusion pattern included in a cover layer of the FPD.

A multi-view (MV) display panel according to another aspect of the present disclosure may be characterized as comprising a flat panel display (FPD) including a plurality of FPD pixels, and a plurality of lenses configured to image the FPD. Each of the plurality of FPD pixels, when imaged through one of the plurality of lenses, forms a beamlet that is emitted in a direction unique from other beamlets formed by other FPD pixels through the lens. The lens and the FPD pixels which, when imaged through the lens, form beamlets emitted in different directions collectively configure an MV pixel. The MV display panel also includes a bezel framing the FPD and the plurality of lenses. An outer perimeter of the plurality of lenses are aligned with an outer perimeter of the bezel such that peripheral areas of outer ones of the plurality of lenses overlap the bezel.

The FPD pixels may be arranged only in imaging areas that are common for all of the plurality of lenses, and the imaging areas may not overlap the bezel. The imaging areas may overlap central areas of the plurality of lenses that are less than the entire areas of the plurality of lenses.

A multi-view (MV) display panel according to yet another aspect of the present disclosure may be characterized as comprising a flat panel display (FPD) including a plurality of FPD pixels, and a plurality of front lenses configured to image the FPD. Each of the plurality of FPD pixels, when imaged through one of the plurality of front lenses, forms a beamlet that is emitted in a direction unique from other beamlets formed by other FPD pixels through the lens. The lens and the FPD pixels which, when imaged through the lens, form beamlets emitted in different directions collectively configure an MV pixel. The MV display panel also includes a plurality of backlights arranged to illuminate the plurality of front lenses, respectively.

The plurality of backlights may be an array of light emitting diodes (LEDs).

A plurality of back lenses may be arranged between the FPD and the plurality of backlights and configured to couple light emitted from the plurality of backlights to the plurality of front lenses, respectively. The plurality of back lenses may comprise condenser optics and the plurality of front lenses comprise projection optics. A convergence angle of one of the plurality of back lenses may correspond to a collection angle of an associated one of the plurality of front lenses.

A multi-view (MV) display panel according to a further aspect of the present disclosure may be characterized as comprising a flat panel display (FPD) including a plurality of FPD pixels, and a lens panel including a plurality of lenses configured to image the FPD. Each of the plurality of FPD pixels, when imaged through one of the plurality of lenses, forms a beamlet that is emitted in a direction unique from other beamlets formed by other FPD pixels through the lens. The lens and the FPD pixels which, when imaged through the lens, form beamlets emitted in different directions collectively configure an MV pixel. Each of the plurality of lenses is formed of multiple lens elements that are layered including a top lens element and a bottom element. The lens panel includes a top layer including a plurality of the top lens elements and a lower layer including a plurality of the bottom lens elements. The top layer includes a first top layer piece and a second top layer piece, and the bottom layer includes a first bottom layer piece and a second bottom layer piece. A boundary between the first top layer piece and the second top layer piece is not aligned with a boundary between the first bottom layer piece and the second bottom layer piece.

A number of top layer pieces included in the top layer may be different from a number of bottom layer pieces included in the bottom layer.

The lens panel may be assembled by fastening the top layer pieces to the bottom layer pieces.

A shape of the top layer pieces may be different from a shape of the bottom layer pieces.

DETAILED DESCRIPTION

Figure 1:
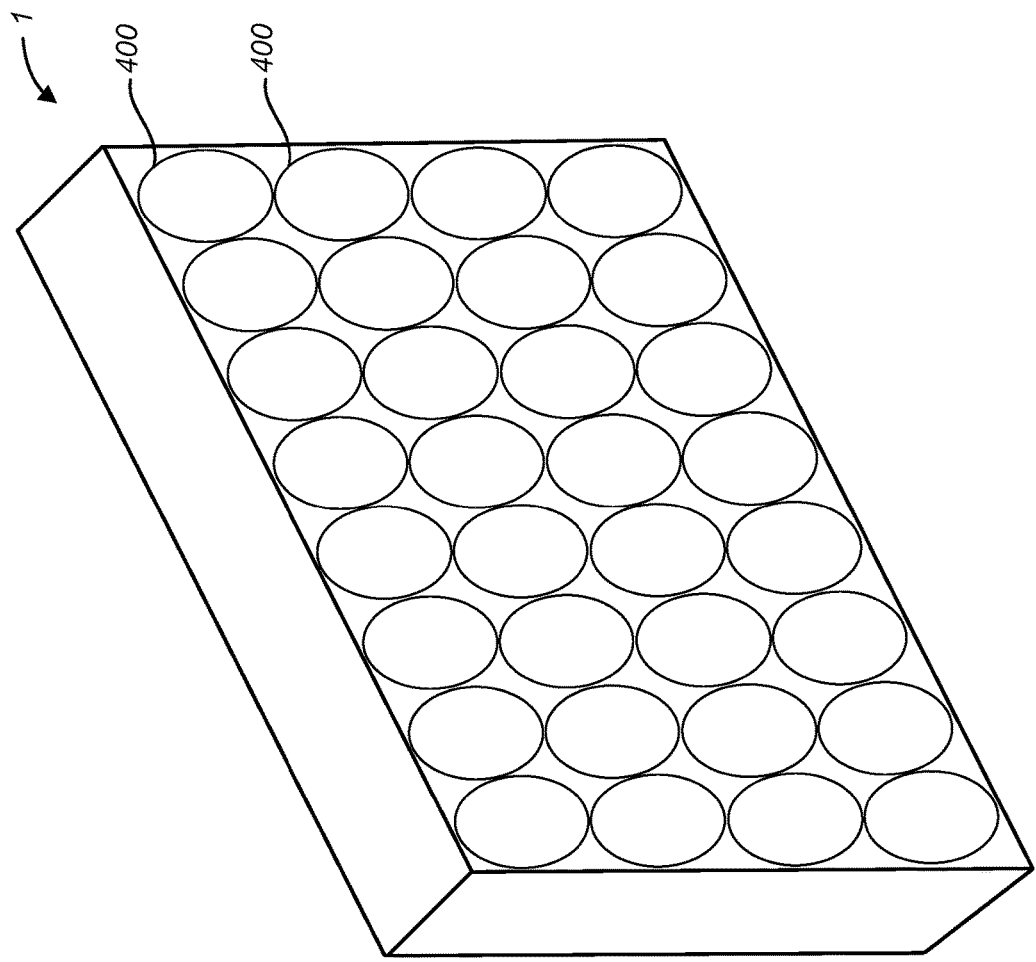
FIG. 1 is a front, perspective view of a precision MV display panel according to one or more embodiments of the present disclosure.

FIG. 1 is a front, perspective view of a precision MV display panel 1 according to one or more embodiments of the present disclosure. As described below, the precision MV display panel 1 comprises MV pixels, each of which can emit different colored light in different directions. These individually controllable units of light, or beamlets, allow multiple viewers to simultaneously perceive different messages, content, or visual effects on the same shared display. The beamlets of a MV pixel can be defined using a beamlet coordinate system, and multiple beamlet coordinate systems may be configured for multiple MV pixels, respectively, for example, as described at column 19, line 40, to column 20, line 52 of U.S. Pat. No. 10,778,962.

Figure 2:
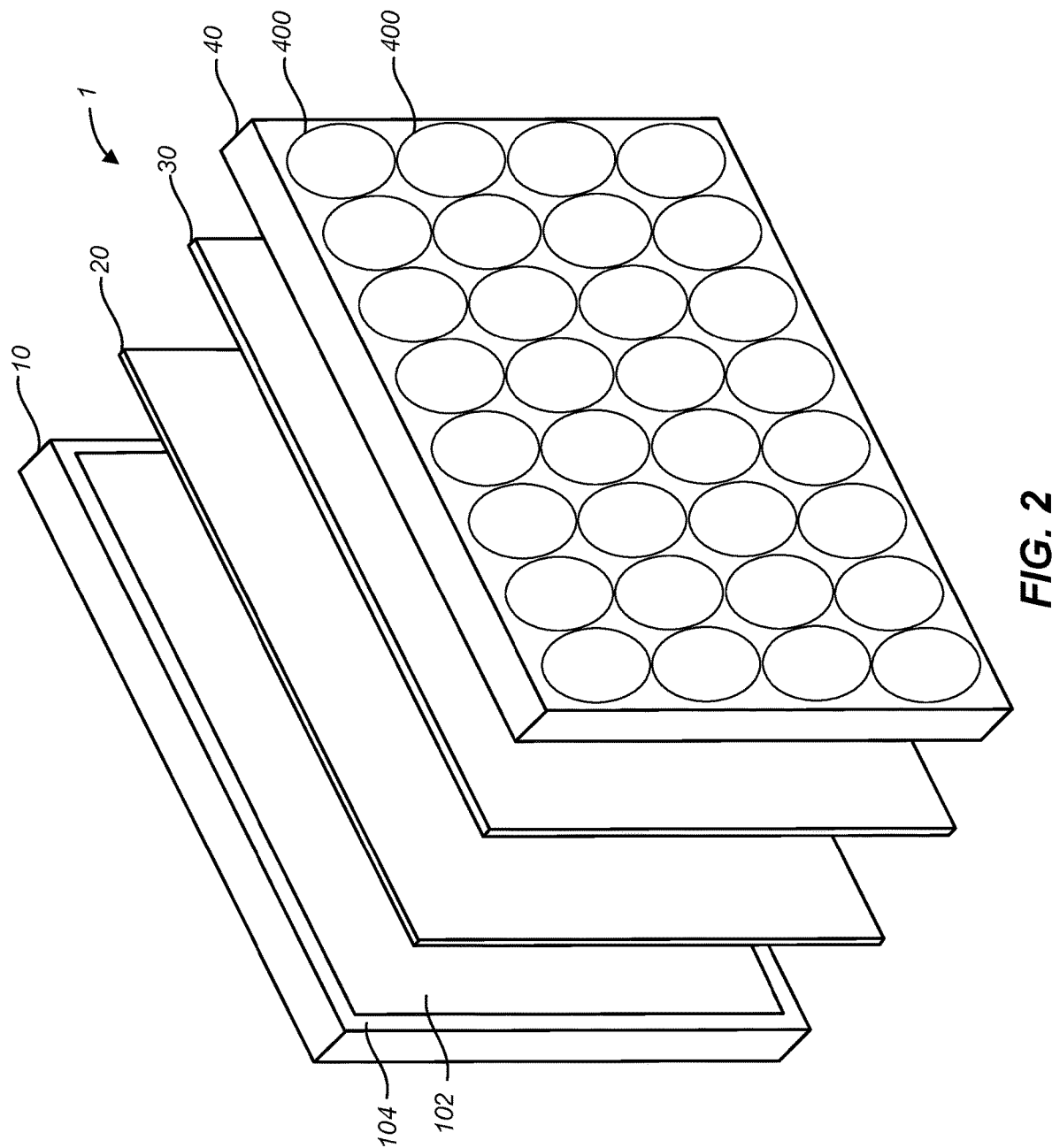
FIG. 2 is an exploded front view of internal components of the precision MV display panel shown in FIG. 1 according to one or more embodiments of the present disclosure.
Figure 3A:
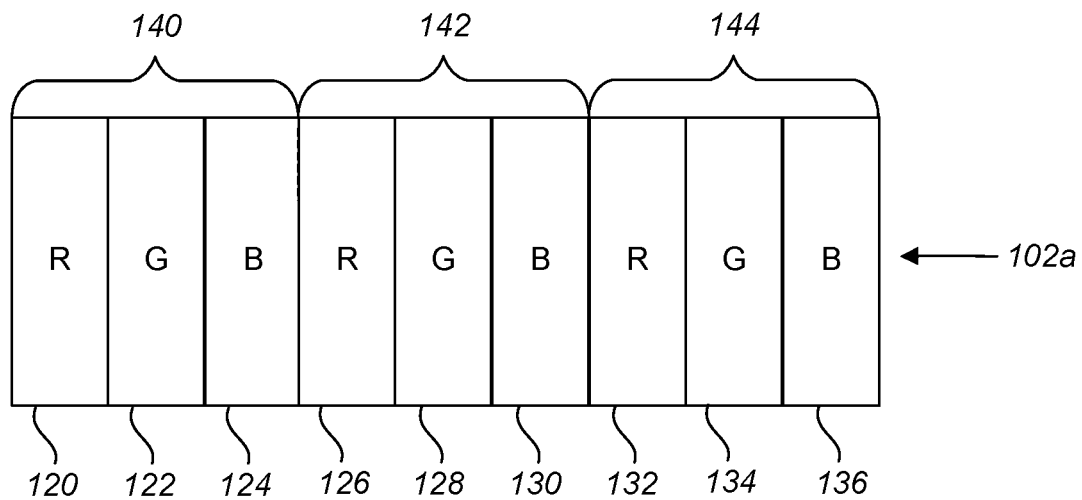
FIG. 3A is block diagram of a portion of the display screen of the FPD of the MV display panel according to one or more embodiments of the present disclosure.

FIG. 2 is an exploded front view of internal components of the precision MV display panel 1 shown in FIG. 1 according to one or more embodiments of the present disclosure. As shown in FIG. 2, the precision MV display panel 1 includes a flat panel display (FPD) 10 having a display screen 102 that is surrounded by a bezel 104. The display screen 102 of the FPD 10 includes a plurality of FPD picture elements or pixels, some of which are shown in FIG. 3A. The FPD 10 may be a LCD (liquid crystal display), an OLED (organic light-emitting diode) display, or a micro LED display, for example. In one or more embodiments, the FPD 10 includes a cover layer, such as cover glass, to protect internal layers, such as polarizers, liquid crystal layers, and thin film transistor backplanes.

The MV display panel 1 also includes a light block 20. In one or more embodiments, the light block 20 is included in a diffusion film (e.g., diffusion layer 30) that is placed on the FPD 10. In one or more embodiments, the light block 20 is included in a diffusion cover layer of the FPD 10. In one or more embodiments, the light block 20 is included in a diffusion pattern imparted into the cover layer of the FPD 10.

In addition, the MV display panel 1 includes a diffuser 30 that is configured to evenly distribute the light emitted from each of the FPD pixels of the FPD 10. As described in connection with FIG. 3A, for example, a FPD pixel in the display screen 102 of the FPD 10 may comprise multiple FPD sub-pixels, such as one or more red, green, blue, or white sub-pixels. When the display screen 102 of the FPD 10 is viewed directly from a far enough distance such that the angular separation of the FPD sub-pixels is smaller than the resolution of an eye, the FPD sub-pixels appear to blend together to create a combined color. In the MV display panel 1, however, the FPD pixels are viewed through a lens, which may exhibit color separation between the distinct FPD sub-pixels. Therefore, it may be advantageous to employ the diffuser 30 between the FPD 10 and a lens (e.g., lens 400) to mix the FPD sub-pixels prior to emitting from the lens as a beamlet.

In some embodiments, the diffuser 30 may exhibit an asymmetric diffusion, such as an elliptical diffusion profile. An asymmetric diffusion may be advantageous with FPDs where the desired diffusion angle in one dimension differs from another dimension. For example, in LCDs with RGB subpixels oriented as vertical stripes, the optical performance of the MV display panel 1 may be better if the vertical diffusion angle is narrower than the horizontal diffusion angle. The narrower vertical diffusion would allow less light from a pixel to spill into a vertically neighboring pixel.

In addition, the MV display panel 1 includes a lens panel 40 that has a plurality of lenses 400 arranged in a two-dimensional array. The plurality of lenses 400 image the FPD 10. The diffuser 30 is arranged between the FPD 10 and the plurality of lenses 400. Each of the FPD pixels of the FPD 10, when imaged through one of the plurality of lenses 400, forms a beamlet that is emitted in a direction unique from other beamlets formed by other FPD pixels through the one of the plurality of lenses 400. The one of the plurality of lenses 400 and the FPD pixels which, when imaged through the one of the plurality of lenses 400, form beamlets emitted in different directions collectively configure a MV pixel. As described in detail below, the light block 20 is configured to isolate a diffusion of multiple FPD sub-pixels of the FPD 10 comprising each FPD pixel from its neighboring FPD pixels. Each lens 400 may comprise multiple lens elements to achieve the desired optical performance, as described below in connection with FIGS. 10, 11, 12A, 12B, and 12C.

FIG. 3A is a block diagram of a portion 102a of the display screen 102 of the FPD 10 of the MV display panel 1 according to one or more embodiments of the present disclosure. The portion 102a of the display screen 102 of the FPD 10 includes FPD sub-picture elements or sub-pixels 120-136. The FPD sub-pixels 120-124 are sub-pixels of a FPD pixel 140, wherein the FPD sub-pixel 120 is configured to emit red light, the FPD sub-pixel 122 is configured to emit green light, and the FPD sub-pixel 124 is configured to emit blue light. The FPD sub-pixels 126-130 are sub-pixels of a FPD pixel 142, wherein the FPD sub-pixel 126 is configured to emit red light, the FPD sub-pixel 128 is configured to emit green light, and the FPD sub-pixel 130 is configured to emit blue light. The FPD sub-pixels 132-136 are sub-pixels of a FPD pixel 144, wherein the FPD sub-pixel 132 is configured to emit red light, the FPD sub-pixel 134 is configured to emit green light, and the FPD sub-pixel 136 is configured to emit blue light. Accordingly, in the example of FIG. 3A, each of the FPD 140-144 pixels includes three FPD sub-pixels.

The MV display panel 1 also includes a display controller, for example, that is similar in many relevant respects to the display controller shown in FIG. 19 of U.S. Pat. No. 10,778,962. The display controller controls the intensity of light emitted by each of the red, blue, and green FPD sub-pixels of an FPD pixel, in order to cause the FPD pixel to appear a desired color.

Figure 3B:
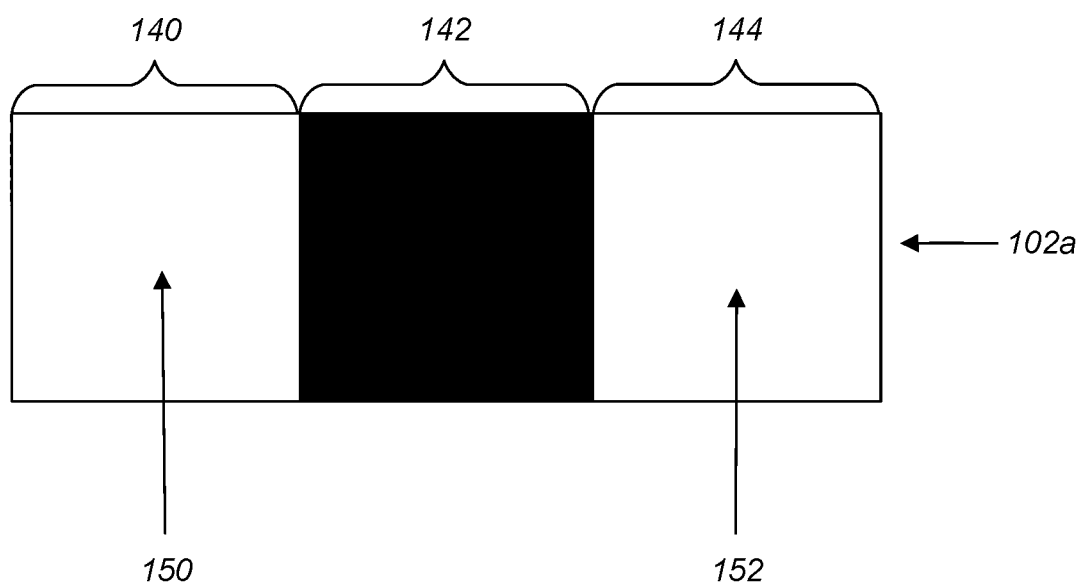
FIG. 3B is a first example of light emitted by the portion of the display screen of the FPD of the MV display panel shown in FIG. 3A.
Figure 3C:
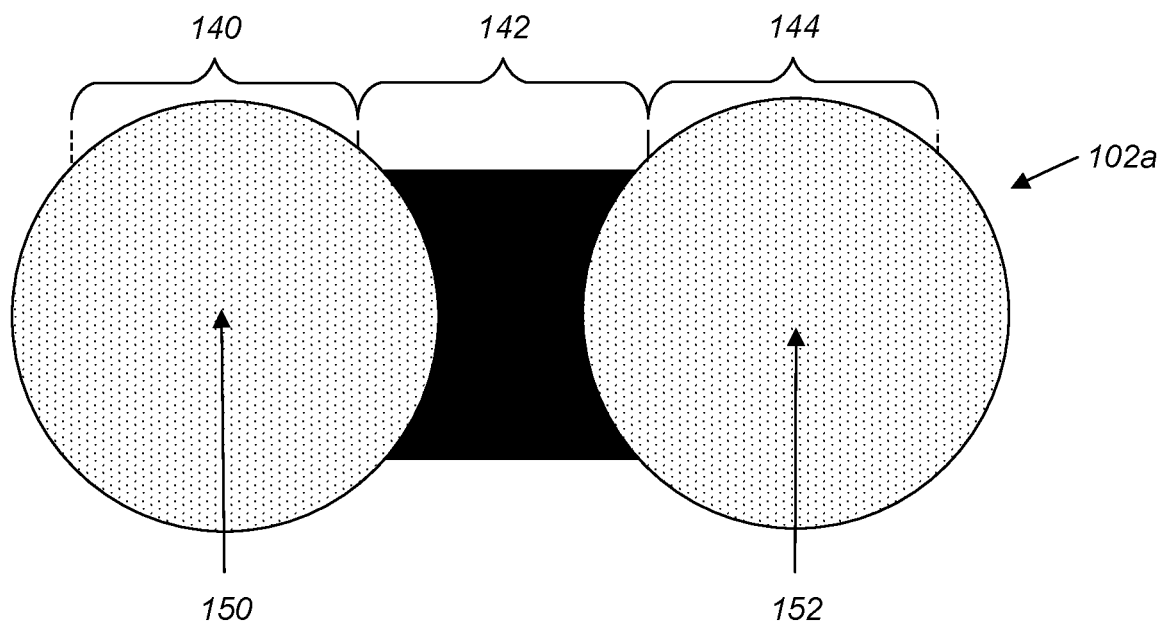
FIG. 3C is a second example of light emitted by the portion of the display screen of the FPD of the MV display panel shown in FIG. 3A.

In order to explain benefits of the light block 20, FIGS. 3B and 3C are examples of light emitted by the portion 120a of the display screen 120 of the FPD 10 of the MV display panel 1 shown in FIG. 3A when the light block 20 is not used. In the examples of FIGS. 3B and 3C, each of the FPD sub-pixels 120-124 of the FPD pixel 140 is controlled to emit light in order to cause white light 150 to be emitted from the FPD pixel 140. Also, each of the FPD sub-pixels 126-130 of the FPD pixel 142 is controlled to not emit light in order to cause no light to be emitted from the FPD pixel 142; thus, the FPD pixel 142 appears black. In addition, each of the FPD sub-pixels 132-136 of the FPD pixel 144 is controlled to emit light in order to cause white light 152 to be emitted from the FPD pixel 144.

FIG. 3B represents an ideal case in which light emitted from each of the FPD sub-pixels 120-124 of the FPD pixel 140 is completely diffused and, thus, the light 150 emitted from the FPD pixel 140 appears to be uniformly white. Similarly, light emitted from each of the FPD sub-pixels 132-136 of the FPD pixel 144 is completely diffused and, thus, the light 152 emitted from the FPD pixel 144 appears to be uniformly white. Also, the light 150 emitted from the FPD pixel 140 and the light 152 emitted from the FPD pixel 144 does not bleed into areas over neighboring FPD pixels, such as the FPD pixel 142.

FIG. 3C represents a non-ideal case in which the light emitted from each of the FPD sub-pixels 120-124 of the FPD pixel 140 is not completely diffused and, thus, the light 150 emitted from the FPD pixel 140 does not appear to be uniformly white. Similarly, the light emitted from each of the FPD sub-pixels 132-136 of the FPD pixel 144 is not completely diffused and, thus, the light 152 emitted from the FPD pixel 144 does not appear to be uniformly white. In other words, the light 150 emitted from the FPD pixel 140 and the light 152 emitted from the FPD pixel 144 have minor variations in color from pure white, and thus do not appear to be completely white. Notably, the light 150 emitted from the FPD pixel 140 and the light 150 emitted from the FPD pixel 144 bleeds into an area above neighboring FPD pixels, such as the FPD pixel 142.

Figure 3D:
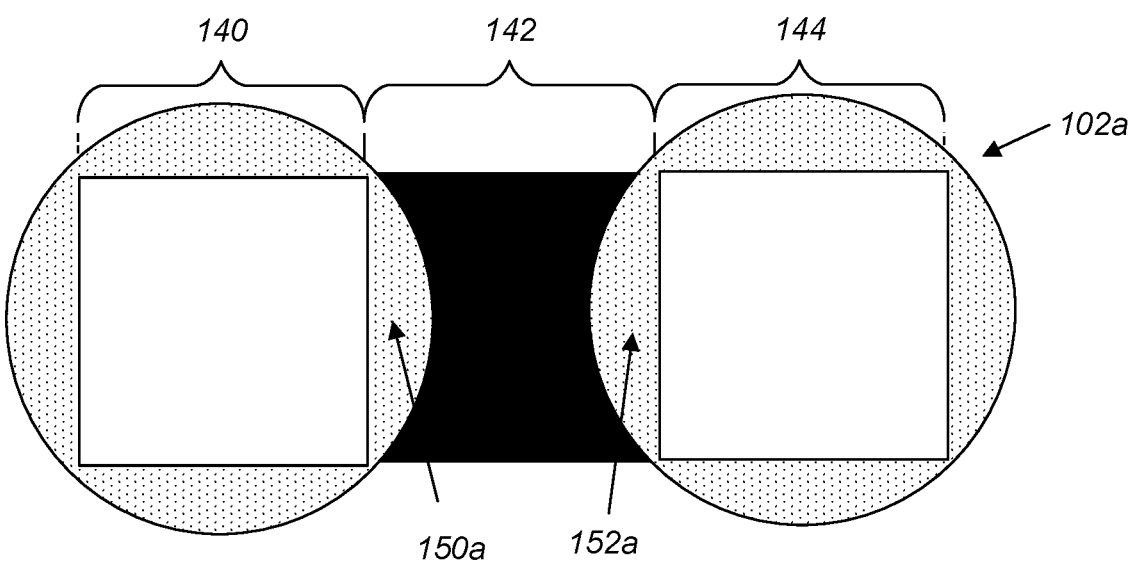
FIG. 3D shows the first example of FIG. 3B superimposed on the second example of FIG. 3C.

FIG. 3D shows the ideal case shown in the first example of FIG. 3B superimposed on the non-ideal case shown in the second example of FIG. 3C. As illustrated in FIG. 3D, a portion 150a of the light 150 emitted from the FPD pixel 140 is stray light that bleeds into an area above the FPD pixel 142. Similarly, a portion 152a of the light 152 emitted from the FPD pixel 144 is stray light that bleeds into an area above the FPD pixel 142. Such stray light causes a ghosting effect that degrades display quality.

As described below, when the light block 20 is used, the light block 20 prevents a diffusion of each FPD pixel from bleeding into areas above its neighboring FPD pixels, for example, as shown in FIG. 3C. Thus, the light block 20 prevents degradation of display quality caused by stray light emitted from FPD pixels that bleeds into the area above neighboring FPD pixels.

Figure 4:
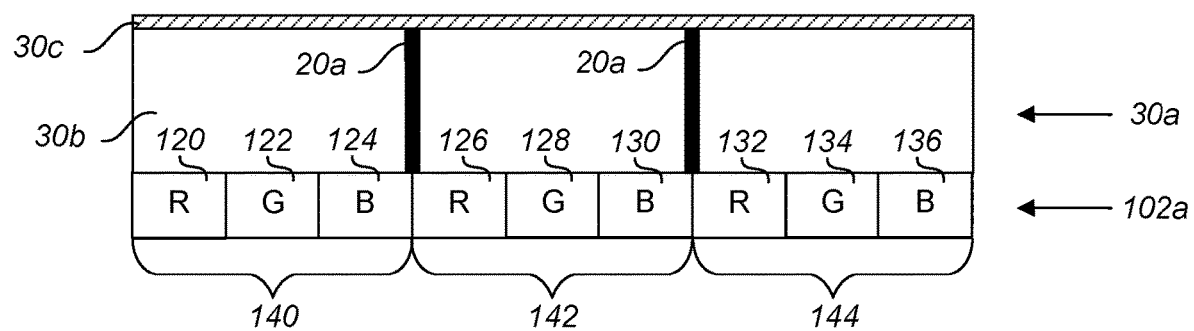
FIG. 4 is a cross-sectional view of a portion of an MV display panel including a light block according to one or more embodiments of the present disclosure.

FIG. 4 is a cross-sectional view of a portion of the MV display panel 1 including a light block according to one or more embodiments of the present disclosure. More particularly, FIG. 4 shows the portion 102a of the display screen 102 of the FPD 10, portions 20a of the light block 20, and a portion 30a of the diffuser 30. The portion 30a of the diffuser 30 includes a substrate 30b and a surface 30c. The portions 20a of the light block 20 are formed within the substrate 30b of the diffuser 30. In one or more embodiments, the portions 20a of the light block 20 are formed as grooves that are etched into the substrate 30b of the diffuser 30, and the diffuser 30 is provided as cover layer of the display screen 102 of the FPD 10. In one or more embodiments, the diffuser 30 is provided as a diffusion film that is placed on the display screen 102 of the FPD 10. In one or more embodiments, the diffuser 30 is provided as a diffusion pattern included in the cover layer of the display screen 102 of the FPD 10.

In the example of FIG. 4, the portions 20a of the light block 20 may comprise grooves that are etched into a cover layer of the FPD 10, aligned with perimeters of each of the FPD pixel 140, 142, and 144, and configured to prevent light emitted from each of the FPD pixels 140, 142, and 144 from passing into an area above its neighboring FPD pixels. For example, the portions 20a of the light block 20 prevent light emitted from the FPD pixel 140 from passing into an area above the FPD pixel 142. In one or more embodiments, the portions 20a of the light block 20 may be filled with an opaque material to absorb stray light that is emitted from the FPD pixel 140, 142, and 144.

In one or more embodiments, the diffuser 30 includes a diffusion pattern on a film or cover layer that is tailored for the pixel and sub-pixel pattern in the underlying FPD. For example, to isolate the diffusion of the RGB sub-pixels of an LCD pixel from its neighboring pixels, grooves may be etched into the cover layer aligned with the perimeters of each LCD pixel, such that the grooves interrupt the light that would otherwise pass from one LCD pixel into the area above another LCD pixel. Furthermore, the grooves may be filled with an opaque material to absorb the stray light. The material properties of the cover layer may be tuned such that the coefficient of thermal expansion substantially matches or corresponds to that of the underlying LCD layers, to mitigate misalignment due to thermal expansion or contraction.

Figure 5:
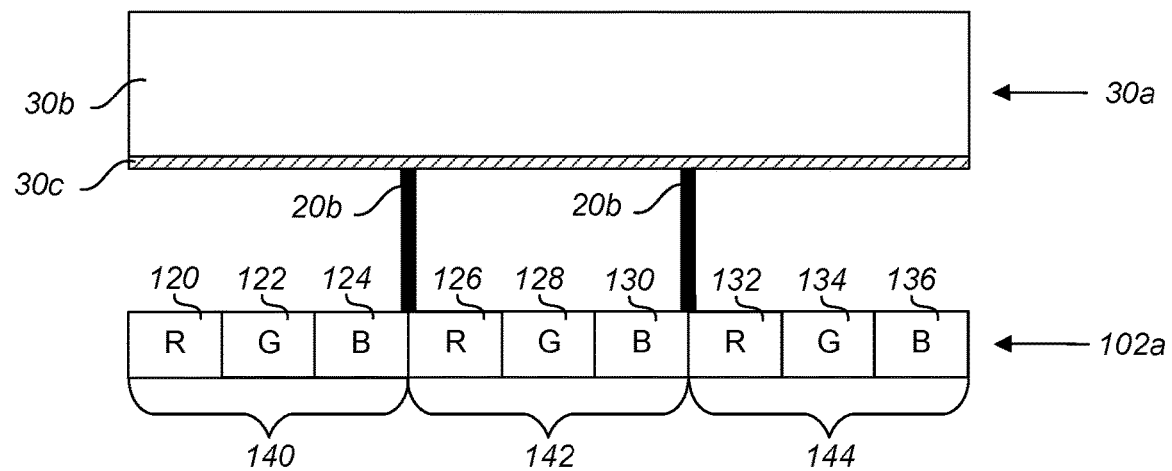
FIG. 5 is a cross-sectional view of a portion of an MV display panel including a light block according to one or more embodiments of the present disclosure.

In one or more embodiments, the light block 20 is a baffle layer placed between the LCD 10 and the diffuser 30 to provide stray light mitigation, by blocking stray light. For example, FIG. 5 is a cross-sectional view of a portion of the MV display panel 1 including a light block according to one or more embodiments of the present disclosure. More particularly, FIG. 5 shows the portion 102*a* of the display screen 102 of the FPD 10, portions 20*b* of the light block 20, and the portion 30*a* of the diffuser 30. The portion 30*a* of the diffuser 30 includes a substrate 30*b* and a surface 30*c*. The portions 20*b* of the light block 20 are formed as projections that extend from the surface 30*c* of the diffuser 30. In one or more embodiments, the portions 20*b* of the light block 20 comprises micro-optics or electromagnetic metasurfaces that prevent light from passing through the portions 20*b* of the light block 20 formed. In one or more embodiments, the diffuser 30 is a film in which the portions 20*b* of the light block 20 are micro-optic surfaces and arranged to interact with incident light such that the incident light from each FPD pixel does not bleed into its neighboring FPD pixels. For example in such a film, the portions 20*b* of the light block 20 are disposed around boundaries of each of the FPD pixels 140, 142, and 144 in order to cause those FPD pixels to appear similar to the ideal case shown FIG. 3B, when the FPD pixels 140 and 144 are driven to emit white light and the FPD pixel 142 is not driven to emit light.

A plurality of the MV display panels 1 can be tiled adjacently to form larger display installations. As a result, it may be desirable to minimize the thickness (or width, as seen in a plan view) of the borders or bezels (e.g., bezel 104) of the MV display panels 1. If the lens panel 40 is positioned over only an active area corresponding to the display screen 102 of each FPD 10, the perceived bezel thickness can be exacerbated (i.e., further increased) by FPD electronics in an inactive area, because of the separation distance between the boundary of lenses 400 of the lens panels 40 of two adjacently tiled MV display panels 1.

Figure 6:
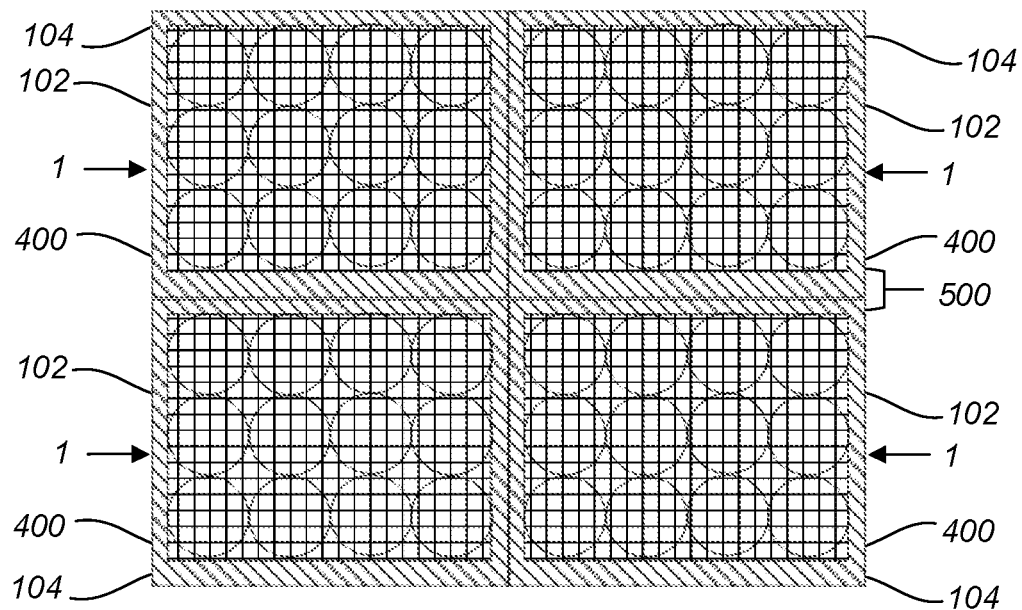
FIG. 6 shows a first example in which multiple MV display panels are tiled to form a larger display installation according to one or more embodiments of the present disclosure.

FIG. 6 shows a first example in which four of the MV display panels 1 are tiled together in a two-by-two array to form a larger display installation according to one or more embodiments of the present disclosure. In the example of FIG. 6, the lenses 400 of the lens panel 40 are disposed within active areas corresponding to the display screens 102 of the FPDs 10. In other words, the lenses 400 of the lens panel 40 are not disposed within inactive areas corresponding to the bezels 104 of the FPDs 10. Because the lenses 400 are not disposed within the bezels 104 of the FPDs 10, a perceived bezel 500 between the upper MV display panels 1 and the lower MV display panels 1 is relatively large.

In one or more embodiments, the lenses 400 of the lens panel 40 on the perimeters of the MV display panels 1 overlap the bezels 104 of the FPDs 10, such that when two MV display panels 1 are tiled adjacently, the boundary of the lenses 400 of the lens panel 40 of the two MV display panels 1 are closer together and separated by a distance that is less than the width of the bezels 104 of the FPDs 10. This may create the appearance of a narrower bezel between two adjacent MV display panels 1. The imaging area beneath each lens 400 on the border may then comprise only a portion of the total area beneath the lenses 400 of the lens panel 40 (other than the portions of the lenses 400 of the lens panel 40 overlapping the bezels 104 of the FPD 10).

Figure 7:
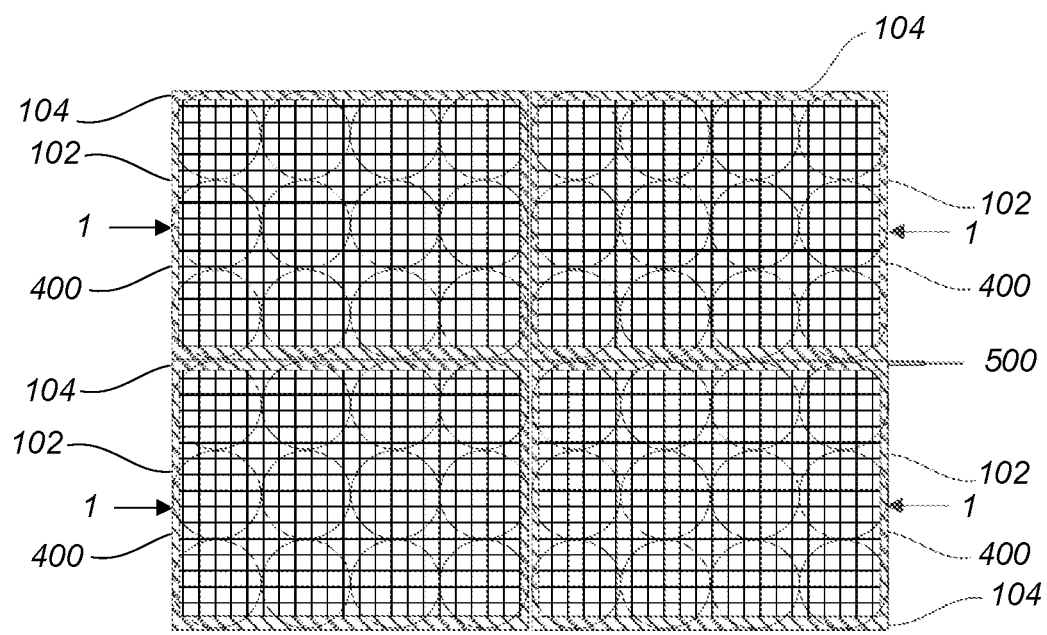
FIG. 7 shows a second example in which multiple MV display panels are tiled to form a larger display installation according to one or more embodiments of the present disclosure.

FIG. 7 shows a second example in which four of the MV display panels 1 are tiled together in a two-by-two array to form a larger display installation according to one or more embodiments of the present disclosure. In the example of FIG. 7, the lenses 400 of the lens panel 40 are disposed within both the active areas corresponding to the display screens 102 of the FPDs 10 and the inactive areas corresponding to the bezels 104 of the FPDs 10. Accordingly, the perceived bezel 500 between the upper MV display panels 1 and the lower MV display panels 1 is relatively small compared to the example of FIG. 6.

It may be advantageous for each lens 400 in an MV display panel 1 to have substantially the same design, to ease design and manufacturing. However, if some lenses 400 in the MV display panel 1 overlap bezels 104 of the FPD 10, and therefore have a reduced imaging area, while other lenses do not, it may be desirable to design the FPD 10 to have FPD pixels only in imaging areas that are common for all lenses in the MV display panel 1. In such a FPD 10, the FPD pixels may be organized in patches, with the patches distributed under central areas of each lens 400. The size of each patch may be smaller than the entire area underneath the corresponding lens 400, in which case the imaging area of the lens 400 may be reduced from the size of the entire area. Reducing the size of the imaging area may afford beneficial tradeoffs in the optical design of the lens 400. In addition, the gap between patches may allow the boundary lenses 400 of two adjacent MV display panels 1 to be closer together, thereby reducing or eliminating the perceived bezel.

Figure 8:
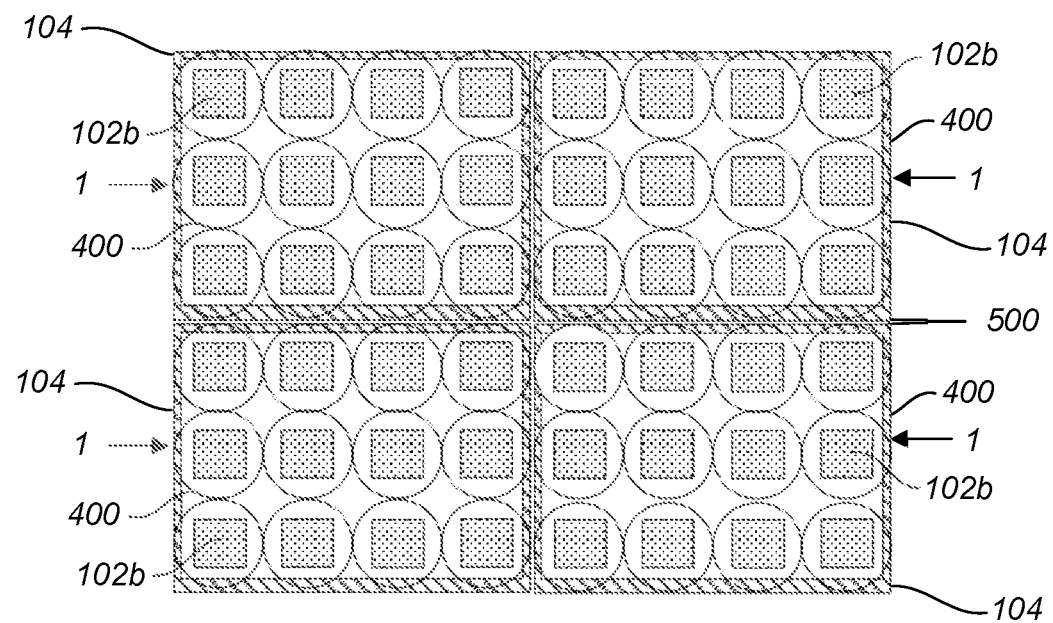
FIG. 8 shows a third example in which multiple MV display panels are tiled to form a larger display installation according to one or more embodiments of the present disclosure.

FIG. 8 shows a third example in which four of the MV display panels 1 are tiled together in a two-by-two array to form a larger display installation according to one or more embodiments of the present disclosure. In the example of FIG. 8, patches of FPD pixels 102*b* are arranged only in imaging areas of the display screen 102 that are common for all of the plurality of lenses 400, wherein the imaging areas do not overlap the bezels 104 of the FPDs 10. The imaging areas in which the patches of FPD pixels 102*b* are arranged overlap central areas of the lenses 400 that are less than entire areas of the lenses 400. The lenses 400 are disposed within active areas corresponding to the display screens 102 of the FPDs 10 and the inactive areas corresponding to the bezels 104 of the FPDs 10. As shown in FIG. 8, the patches of FPD pixels 102*b* are arranged only in imaging areas that are common for all of the lenses 400, wherein the imaging areas do not overlap the bezels 104 of the FPDs 10 of the MV display panels 1. As with the example of FIG. 7, the perceived bezel 500 between the upper MV display panels 1 and the lower MV display panels 1 is relatively small compared to the example of FIG. 6. As shown in FIG. 8, for example, an outer perimeter of the lenses 400 are aligned with an outer perimeter of the bezels 104 such that peripheral areas of outer lenses 400 overlap the bezels 104. Also, imaging areas corresponding to the patches of FPD pixels 102*b* overlap central areas of the lenses 400, wherein the central areas of the lenses 400 are less than entire areas of the lenses 400.

As previously mentioned, the FPD 10 may be a LCD. LCDs typically comprise a backlighting unit and filter layers to create pixels. Often, LCDs with high pixel density are designed for energy efficiency or thin form factor, such as for laptop or tablet displays. Backlight designs for these use cases often comprise edge-lit LED bars and optical waveguides to uniformly distribute the LED light across the area of the LCD. However, this may limit the total optical power through the LCD, because a limited number of LEDs may be placed along the edge. Other LCD use cases with higher brightness, such as TVs or digital signage, may use full array or direct-lit LED backlights, where LEDs are arranged across the entire area behind the LCD. These LED backlights are typically designed for uniform distribution of light with high viewing angles, ideally close to 180 degrees.

In an MV display panel 1 that utilizes an LCD as the FPD 10, however, the lenses 400 are placed above the FPD 10, such that only a portion of the light emitting from the FPD 10 may be collected by the lenses 400. Therefore, a more efficient LCD backlight design may be desirable for utilization in an MV display panel 1.

Figure 9:
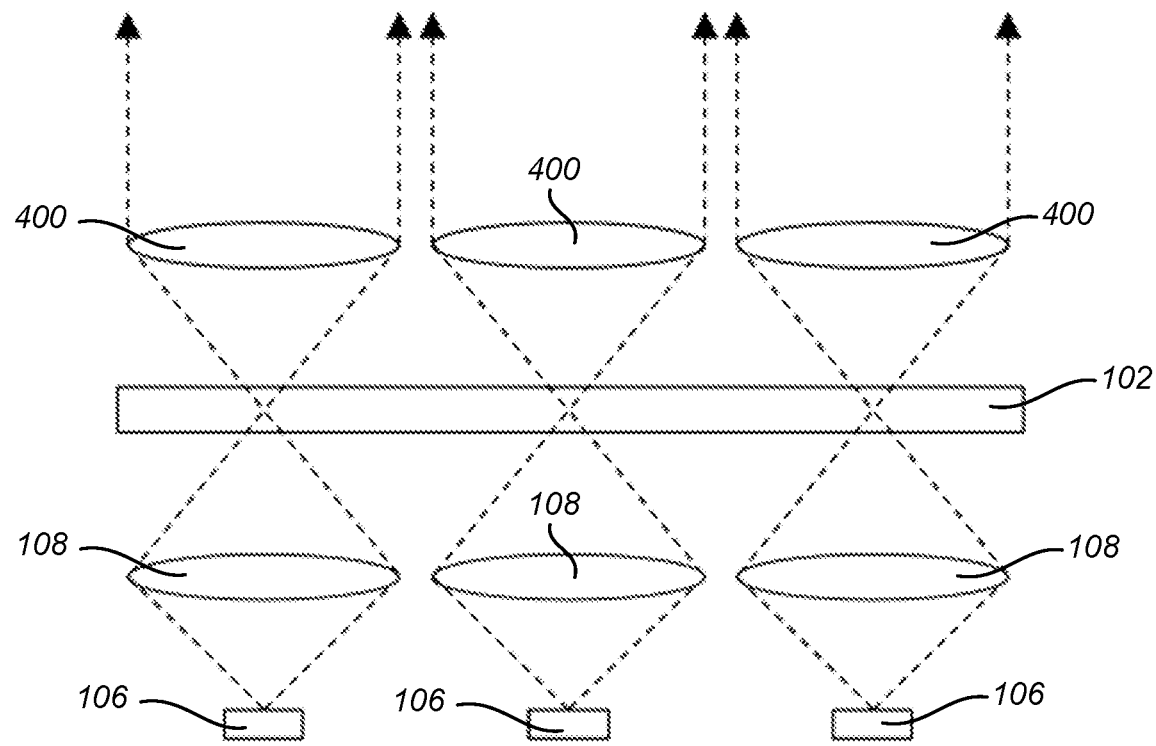
FIG. 9 shows an example of backlighting in an MV display panel according to one or more embodiments of the present disclosure.

FIG. 9 shows an example of backlighting in an MV display panel 1 according to one or more embodiments of the present disclosure. The MV display panel 1 comprises an array of front lenses 400 and a FPD 10 that is an LCD with a backlight comprising an array of light sources 106, such as LEDs, and an array of rear lenses 108. Each rear lens 108, which may comprise condenser optics, collects the light emitted from the associated light source 106 and couples it with the associated front lens 400, which may comprise projection optics. Each rear lens 108 may be designed such that the convergence angle substantially matches or corresponds to the collection angle of the front lens 400 to improve efficiency. Homogenizer tunnels, Fresnel lenses, or other optical elements may be used. Each light source 106 may comprise one or more LEDs, including but not limited to red, green, blue, or white LEDs.

An MV display panel may comprise a plurality of lenses 400 on top of or in front of the FPD 10, with each lens 400 forming one multi-view pixel. In one or more embodiments, the entire lens panel 40 may be manufactured as a single piece. In other embodiments, the lens panel 40 may be manufactured in multiple pieces. This may be done to improve manufacturing yield by reducing the size of each piece.

Figure 10:
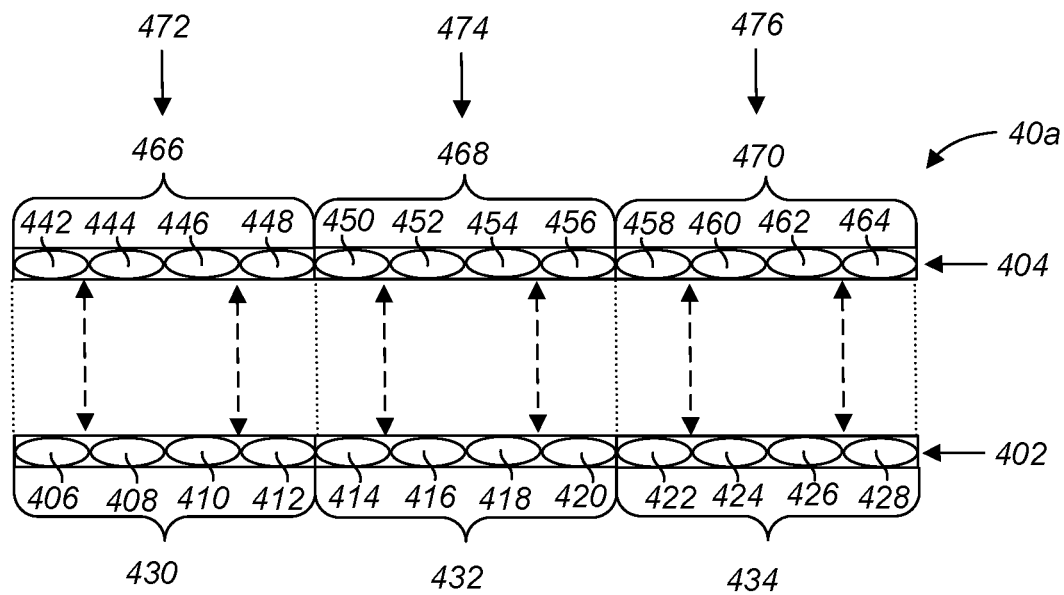
FIG. 10 shows a first example of an exploded cross-sectional view of a portion of a lens panel according to one or more embodiments of the present disclosure.

In one or more embodiments, each of the lens 400 comprises multiple lens elements to achieve a desired optical quality of the lens panel 40. FIG. 10 shows a first example of an exploded cross-sectional view of a portion 40*a* of the lens panel 40 according to one or more embodiments of the present disclosure. The portion 40*a* of the lens panel 40 includes a bottom lens element layer 402 and a top lens element layer 404, wherein twelve lens elements are formed in each of the layers 402 and 404. More particularly, lens elements 406-428 are formed in the bottom lens element layer 402 and lens elements 442-464 are formed in the top layer 404.

In one or more embodiments, a lens element piece for multiple lenses may be manufactured as a single piece to reduce the number of overall parts in the lens array. For example, in FIG. 10, three bottom lens element pieces 430, 432, and 434 are provided, each as a single piece including four bottom lens elements, to collectively form the bottom lens element layer 402. More particularly, the bottom lens element piece 430 includes the lens elements 406-412, the bottom lens element piece 432 includes the lens elements 414-420, and the bottom lens element piece 434 includes the lens elements 422-428. Similarly, three top lens element pieces 466, 468, and 470 are provided, each as a single piece including four top lens elements, to collectively form the top layer 404. More particularly, the top lens element piece 466 includes the lens elements 442-448, the top lens element piece 468 includes the lens elements 450-456, and the top lens element piece 470 includes the lens elements 458-464.

The top and bottom lens element pieces may be fastened together to create an assembled piece including multiple multi-element lenses. For example, the top lens element piece 466 is fastened to the bottom lens element piece 430, at fastening locations pointed to by the arrows of the dashed lines in FIG. 10, to form an assembled piece 472. The top lens element piece 468 is fastened to the bottom lens element piece 432, at fastening locations pointed to by the arrows of the dashed lines in FIG. 10, to form an assembled piece 474. The top lens element piece 470 is fastened to the bottom lens element piece 434, at fastening locations pointed to by the arrows of the dashed lines in FIG. 10, to form an assembled piece 476. Thus, in the example of FIG. 10, the assembled pieces 472, 474, and 476 are created, each including four multi-element lenses comprised of eight lens elements.

In the example of FIG. 10, the number and arrangement of lens elements in each lens element piece are the same across the bottom lens element layer 402 and the top lens element layer 404, resulting in the same number and configuration (e.g., shape) of assembled pieces (assembled pieces 472, 474, and 476) as the number and configuration of the lens element pieces in each of the bottom lens element layer 402 and the top lens element layer 404. Specifically, in the example of FIG. 10, three top lens element pieces and three bottom lens element pieces, each including the same number (i.e., four) and arrangement of lens elements, are fastened together to form three assembled pieces respectively, each including four multi-element lenses.

The multiple assembled pieces, such as assembled pieces 472, 474, and 476, may then be assembled together on top of the FPD 10 using a variety of methods, including but not limited to securing to a rail or snapping together using kinematic mounting features. For example, the assembled pieces 472, 474, and 476 may be mounted to rails in a manner that is similar to the lens array panel shown in FIG. 6 of U.S. Pat. No. 10,778,962. These techniques may cause mechanical design and assembly complexity compared to a single piece solution. Therefore, a technique to assemble or combine more lens element pieces (e.g., more than two lens element pieces) into one assembled piece may be desirable, so as to reduce the need to further assemble multiple assembled pieces together.

Figure 11:
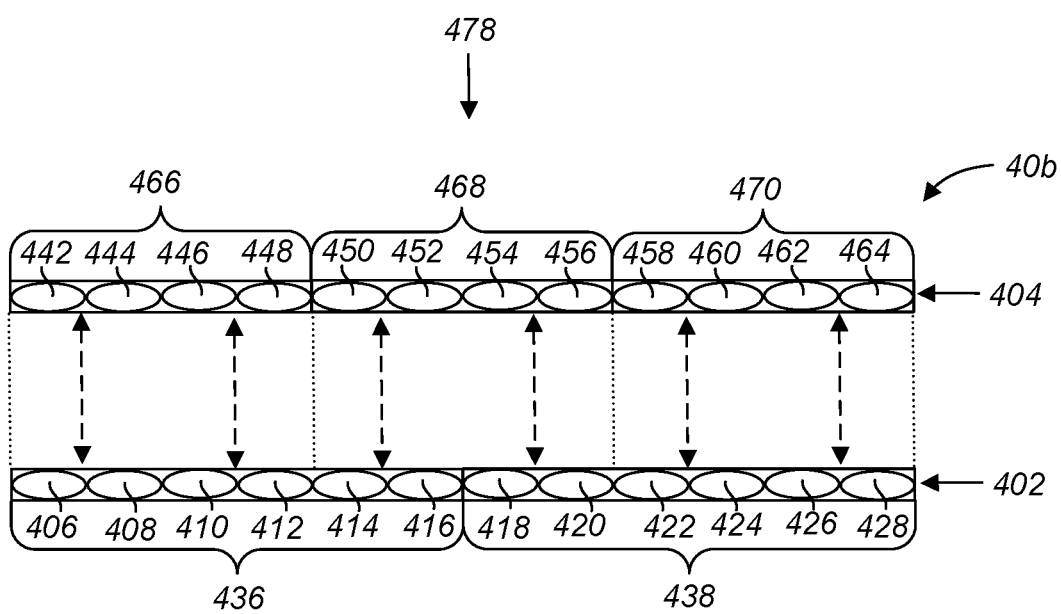
FIG. 11 shows a second example of an exploded cross-sectional view of a portion of a lens panel according to one or more embodiments of the present disclosure.

FIG. 11 shows a second example of an exploded cross-sectional view of a portion 40*b* of a lens panel 40 according to one or more embodiments of the present disclosure. In the example of FIG. 11, the number and arrangement of lens elements in the lens element pieces are different between the bottom lens element layer 402 and the top lens element layer 404. In the example of FIG. 11, two bottom lens element pieces 436 and 438, each including six bottom lens elements, are provided in the bottom lens element layer 402. More particularly, the bottom lens element pieces 436 includes the lens elements 406-416, and the bottom lens element pieces 438 includes the lens elements 418-428. As with the example of FIG. 10, the three top lens element pieces 466, 468, and 470, each including four top lens elements, are provided in the top lens element layer 404. In such a configuration, the boundaries between the bottom lens element pieces in the bottom lens element layer 402 are not necessarily aligned with the boundaries between the top lens element pieces in the top lens element layer 404, such that one of the top lens element pieces in the top lens element layer 404 (e.g., top lens element piece 468) may overlap the boundary between the bottom lens element pieces 436 and 438 in the bottom lens element layer 402. Fastening locations pointed to by the arrows of the dashed lines in FIG. 11 are chosen such that multiple lens element pieces in one layer (bottom lens element layer 402) can be secured together via fastening to multiple lens element pieces in another layer (top lens element layer 404). In the example of FIG. 11, the two bottom lens element pieces 436 and 438 in the bottom lens element layer 402 and the three top lens element pieces 466, 468, and 470 in the top lens element layer 404 are assembled to form a single assembled piece 478, which includes twelve multi-element lenses comprised of twenty-four lens elements. For example, the bottom lens element 406 and the top lens element 442 for one of the multi-element lenses.

Figure 12A:
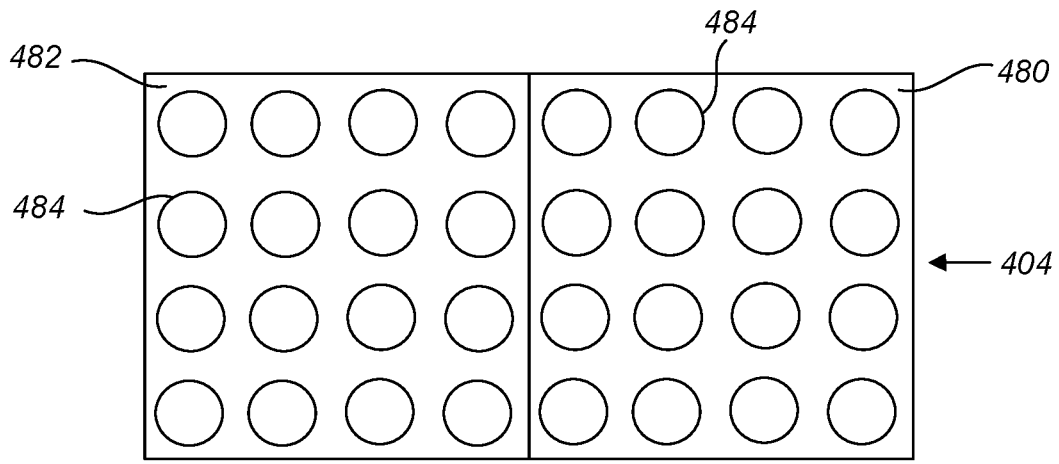
FIG. 12A shows a front, plan view of a top lens element layer according to one or more embodiments of the present disclosure.
Figure 12B:
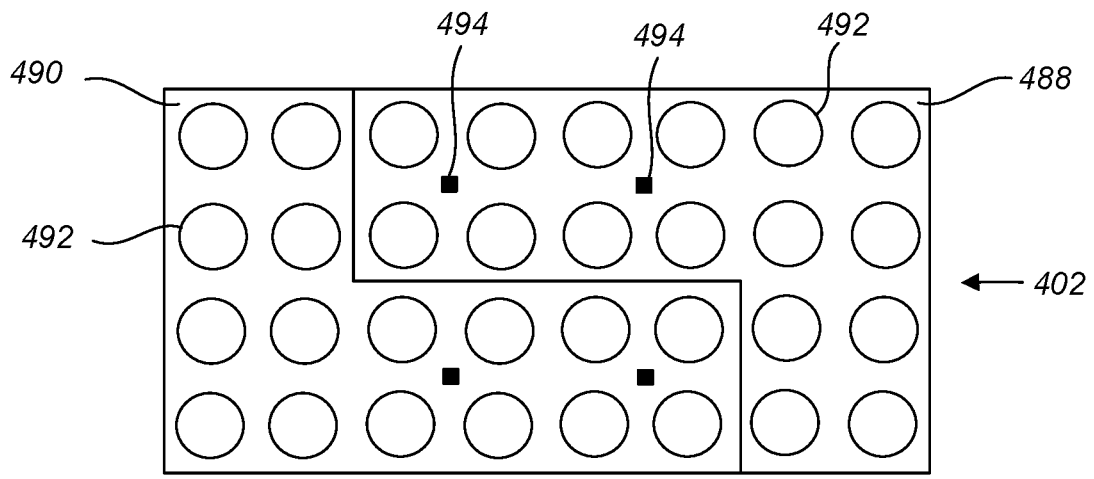
FIG. 12B shows a front, plan view of a bottom lens element layer according to one or more embodiments of the present disclosure
Figure 12C:
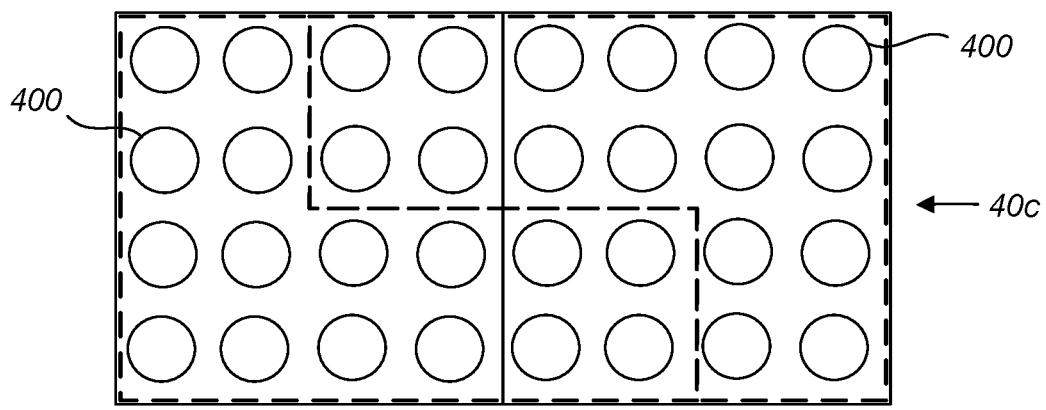
FIG. 12C shows front, plan view of a portion of a lens panel that results from fastening the top lens element layer shown in FIG. 12A to the bottom lens element layer shown in FIG. 12B.

The configuration of the lens panel 40 can be chosen in one dimension, as in the examples of FIGS. 10 and 11, or in two dimensions, as in the example of FIGS. 12A-12C. FIGS. 12A-12C show front, plan views of portions of a lens panel according to one or more embodiments of the present disclosure. More particularly, FIG. 12A shows a front, plan view of a top lens element layer 404 that includes two square-shaped top lens element pieces 480 and 482, each of which include sixteen lens elements 484 and two fastening locations (not shown) on a bottom surface thereof. FIG. 12B shows a front, plan view of a bottom lens element layer 402 that includes two L-shaped bottom lens element pieces 488 and 490, each of which include sixteen lens elements 492 and two fastening locations 494. FIG. 12C shows a front, plan view of a portion 40c of a lens panel 40 that results from fastening the fastening locations 494 on the bottom lens element pieces 488 and 490 in the bottom lens element layer 402 to the corresponding fastening locations on the bottoms of the top lens element pieces 480 and 482 in the top lens element layer 404. The portion 40c of the lens panel 40 is a single assembled piece, which includes thirty-two multi-element lenses 400 comprised of sixty-four lens elements. In FIG. 12C, the dashed lines show outlines of the bottom lens element pieces 488 and 490 included in the bottom lens element layer 402. Each of the multi-element lenses 400 includes one of the lenses 484 of the top lens element layer 404 stacked on top of one of the lenses 492 of the bottom lens element layer 402.

The number of lenses and lens configurations depicted in the figures are only examples. Other numbers of lens elements, lens element pieces, and lens element layers may be used in accordance with the present disclosure. In addition, other shapes and configurations of lens elements, lens element pieces, and lens element layers may be used in accordance with the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A multi-view (MV) display panel comprising:
 a flat panel display (FPD) including a plurality of FPD pixels;
 a plurality of lenses configured to image the FPD, wherein each of the plurality of FPD pixels, while imaged through one of the plurality of lenses, forms a beamlet that is emitted in a direction unique from other beamlets formed by other FPD pixels through said lens;
 wherein said lens and the FPD pixels which, while imaged through said lens, form beamlets emitted in different directions collectively configure an MV pixel;
 wherein each of the plurality of FPD pixels includes multiple sub-pixels;
 a diffuser arranged between the FPD and the plurality of lenses,
 wherein the diffuser is different from the FPD; and
 a light block configured to isolate a diffusion of the multiple sub-pixels of each FPD pixel from its neighboring FPD pixels,
 wherein the light block includes a plurality of portions that extend from the diffuser to the FPD.

2. The MV display panel of claim 1, wherein the light block comprises grooves that are etched into a cover layer of the FPD, aligned with perimeters of each FPD pixel, and configured to prevent light of each FPD pixel from passing into an area above its neighboring FPD pixels.

3. The MV display panel of claim 2, wherein the grooves are filled with an opaque material to absorb stray light.

4. The MV display panel of claim 2, wherein a coefficient of thermal expansion of the cover layer of the FPD is configured to correspond to a coefficient of thermal expansion of an internal layer of the FPD to mitigate misalignment of the grooves relative to the FPD pixels due to thermal expansion or contraction.

5. The MV display panel of claim 1, wherein the light block comprises a baffle layer placed between the FPD and the diffuser.

6. The MV display panel of claim 1, wherein the light block comprises micro-optics or metasurfaces.

7. The MV display panel of claim 1, wherein the FPD is selected from a group consisting of an LCD (liquid crystal display), an OLED (organic light-emitting diode) display, and a micro LED display.

8. The MV display panel of claim 1, wherein each of the plurality of lenses is formed of multiple lens elements that are layered.

9. The MV display panel of claim 1, wherein the diffuser is selected from a group consisting of a diffusion film placed on the FPD, a diffusion cover layer of the FPD, and a diffusion pattern included in a cover layer of the FPD.

10. A multi-view (MV) display panel comprising:
 a flat panel display (FPD) including a plurality of FPD pixels;
 a plurality of lenses configured to image the FPD, wherein each of the plurality of FPD pixels, while imaged through one of the plurality of lenses, forms a beamlet that is emitted in a direction unique from other beamlets formed by other FPD pixels through said lens;

wherein said lens and the FPD pixels which, while imaged through said lens, form beamlets emitted in different directions collectively configure an MV pixel; and a bezel framing the FPD and the plurality of lenses;

wherein the bezel is disposed at an outer perimeter of the MV display panel;

wherein each of the plurality of FPD pixels of the FPD is disposed within an inner perimeter of the bezel in a plan view;

wherein each of the plurality of lenses has a curved shape in the plan view; and wherein an outer perimeter of the curved shape of each of outer ones of the plurality of lenses is aligned with an outer perimeter of the bezel and peripheral areas of the curved shape of each of the outer ones of the plurality of lenses overlap the bezel in the plan view.

11. The MV display panel of claim 10, wherein the FPD pixels are arranged only in imaging areas that are common for all of the plurality of lenses, wherein the imaging areas do not overlap the bezel.

12. The MV display panel of claim 11, wherein the imaging areas overlap central areas of the plurality of lenses that are less than the entire areas of the plurality of lenses.

13. A multi-view (MV) display panel comprising:

a flat panel display (FPD) including a plurality of FPD pixels; and a lens panel including a plurality of lenses configured to image the FPD, wherein each of the plurality of FPD pixels, while imaged through one of the plurality of lenses, forms a beamlet that is emitted in a direction unique from other beamlets formed by other FPD pixels through said lens;

wherein said lens and the FPD pixels which, while imaged through said lens, form beamlets emitted in different directions collectively configure an MV pixel;

wherein each of the plurality of lenses is formed of multiple lens elements that are layered including a top lens element and a bottom element;

wherein the lens panel includes a top layer including a plurality of the top lens elements and a bottom layer including a plurality of the bottom lens elements;

wherein the top layer includes a first top layer piece and a second top layer piece, and the bottom layer includes a first bottom layer piece and a second bottom layer piece;

wherein a boundary between the first top layer piece and the second top layer piece is not aligned with a boundary between the first bottom layer piece and the second bottom layer piece; and wherein the first top layer piece is disposed on both a left side and a right side of the boundary between the first bottom layer piece and the second bottom layer piece in a plan view.

14. The MV display panel of claim 13, wherein a number of top layer pieces included in the top layer is different from a number of bottom layer pieces included in the bottom layer.

15. The MV display panel of claim 13, wherein the lens panel is assembled by fastening the top layer pieces to the bottom layer pieces.

16. The MV display panel of claim 13, wherein a shape of the top layer pieces is different from a shape of the bottom layer pieces.

* * * * *